United States Patent
Kageyama et al.

(10) Patent No.: US 9,762,072 B2
(45) Date of Patent: Sep. 12, 2017

(54) SECONDARY BATTERY PROTECTION CIRCUIT, SECONDARY BATTERY PROTECTION DEVICE, BATTERY PACK AND METHOD OF WRITING DATA

(71) Applicants: Ryota Kageyama, Tokyo (JP); Takashi Takeda, Tokyo (JP); Koichi Murano, Tokyo (JP); Takatoshi Itagaki, Tokyo (JP)

(72) Inventors: Ryota Kageyama, Tokyo (JP); Takashi Takeda, Tokyo (JP); Koichi Murano, Tokyo (JP); Takatoshi Itagaki, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 135 days.

(21) Appl. No.: 14/969,275

(22) Filed: Dec. 15, 2015

(65) Prior Publication Data
US 2016/0190835 A1 Jun. 30, 2016

(30) Foreign Application Priority Data
Dec. 26, 2014 (JP) .................................. 2014-264139

(51) Int. Cl.
*H02J 7/00* (2006.01)
(52) U.S. Cl.
CPC ............ *H02J 7/0029* (2013.01); *H02J 7/007* (2013.01); *H02J 2007/0037* (2013.01)
(58) Field of Classification Search
CPC ... H02J 7/0029; H02J 7/007; H02J 2207/0037
(Continued)

(56) References Cited

U.S. PATENT DOCUMENTS

2003/0076072 A1 4/2003 Tojo et al.
2006/0255768 A1* 11/2006 Yoshio .................. H02J 7/0029
320/134
(Continued)

FOREIGN PATENT DOCUMENTS

JP 2001-275270 10/2001
JP 2008-096140 4/2008
(Continued)

OTHER PUBLICATIONS

Japanese Office Action dated Nov. 17, 2015.

*Primary Examiner* — Nathaniel Pelton
(74) *Attorney, Agent, or Firm* — Ipusa, PLLC

(57) ABSTRACT

A secondary battery protection circuit for protecting a secondary battery including: a power supply terminal; a protection operation circuit configured to monitor a state of the secondary battery through the power supply terminal to generate a signal for turning on/off conduction of a current path between the secondary battery and a load according to a protection state determined by the monitored state of the secondary battery; a nonvolatile memory in which data is written by a writing voltage being provided at the power supply terminal, an operation of the secondary battery protection circuit being controlled by the data; a voltage generation circuit configured to generate a provision voltage which is provided to a low withstand voltage circuit; and a control circuit configured to enable the nonvolatile memory to store the data therein in accordance with the protection state upon an input voltage being greater than a determination threshold voltage.

10 Claims, 9 Drawing Sheets

(58) Field of Classification Search
 USPC .......................................................... 320/136
 See application file for complete search history.

(56) References Cited

U.S. PATENT DOCUMENTS

| | | |
|---|---|---|
| 2010/0213891 A1 | 8/2010 | Nishikawa et al. |
| 2012/0206107 A1* | 8/2012 | Ono ..................... H02J 7/0029 |
| | | 320/136 |
| 2012/0212185 A1 | 8/2012 | Tanaka |
| 2014/0312915 A1* | 10/2014 | Mukaitani .......... G01R 31/3624 |
| | | 324/434 |

FOREIGN PATENT DOCUMENTS

| | | |
|---|---|---|
| JP | 2010-191880 | 9/2010 |
| JP | 2011-153952 | 8/2011 |
| JP | 2012-173063 | 9/2012 |

* cited by examiner

SECONDARY BATTERY PROTECTION CIRCUIT, SECONDARY BATTERY PROTECTION DEVICE, BATTERY PACK AND METHOD OF WRITING DATA

CROSS-REFERENCE TO RELATED APPLICATIONS

This patent application is based upon and claims the benefit of priority of Japanese Patent Application No. 2014-264139, filed on Dec. 26, 2014, the entire contents of which are incorporated herein by reference.

BACKGROUND OF THE INVENTION

1. Field of the Invention

The present technology relates to a secondary battery protection circuit, a secondary battery protection device, a battery pack and a method of writing data.

2. Description of the Related Art

Conventionally, a secondary battery protection circuit for protecting the secondary battery is known (for example, see Patent Document 1). In FIG. 2 in Patent Document 1, a battery pack is disclosed, which includes a flash ROM and a voltage step-up circuit for generating a voltage to write data in the flash ROM. According to Patent Document 1, the voltage step-up circuit is disposed inside the battery pack since the voltage to write data in the flash ROM needs to be greater than the voltage to power the flash ROM. However, area of a chip may become greater due to the voltage step-up circuit, therefore a method for improving chip size reduction is also disclosed.

A specification of the secondary battery protection circuit needs to be customized in accordance with types of the secondary battery or a product in which the secondary battery protection circuit is installed. If a configuration of the secondary battery protection circuit is designed on a type-by-type basis of the secondary battery or the product so as to adapt the secondary battery protection circuit to discrete specifications, a lead time and a cost for development are likely to increase.

Therefore, a design for adapting a common circuit configuration to discrete specifications is proposed, in which a memory for recording data such as respective parameters for defining the specification is disposed and the specification is set based on the parameter data retrieved from the memory. According to the aforementioned design, the specification can be changed in the common circuit configuration by changing the parameter data recorded in the memory. For example, in a case where a voltage value to be set as an overcharge detection voltage, which is included in the specification, is recorded in the memory, the value of the overcharge detection voltage can be changed in the common circuit configuration by changing the set voltage value.

The respective parameters are an overcharge detection threshold voltage, an overcurrent detection threshold voltage, a short-circuiting detection threshold voltage, delay times for performing the respective detections corresponding to the respective threshold voltages, and so on. Also, in a case where trimming is performed so as to absorb dispersion (manufacture irregularity) of the respective threshold voltage, the trimming data is also recorded in the memory.

Meanwhile, in order to write the parameter data for defining the specification of the secondary battery protection circuit in a nonvolatile memory, a voltage greater than an operational voltage (a normal power supply voltage) of the secondary battery protection circuit and the nonvolatile memory is required to be supplied to the nonvolatile memory. Therefore, any of methods can be adopted, in which the power supply voltage is stepped up to generate the voltage to write the data or in which a designated terminal for receiving the voltage to write the data from an external device is provided. However, the area of the chip will increase due to the step-up circuit when adopting the former, and a total number of terminals in the secondary battery protection circuit will increase upon adding the designated terminal for receiving the voltage to write the data to the secondary battery protection circuit when adopting the latter.

RELATED ART DOCUMENT

Patent Document

[Patent Document 1]: Japanese Laid-open Patent Publication No. 2012-173063

SUMMARY OF THE INVENTION

An object of disclosure of the present technology is to provide a technology for enabling to write data in a memory without increasing area of a circuit or disposing an additional terminal.

According to one embodiment of the present invention, there is provided a secondary battery protection circuit for protecting a secondary battery comprising: a power supply terminal; a protection operation circuit configured to monitor a state of the secondary battery through the power supply terminal to generate a signal for turning on/off conduction of a current path between the secondary battery and a load according to a protection state determined by the monitored state of the secondary battery; a nonvolatile memory in which data is written by a writing voltage being provided at the power supply terminal, an operation of the secondary battery protection circuit being controlled by the data; a voltage generation circuit configured to generate from an input voltage at the power supply terminal a provision voltage which is provided to a low withstand voltage circuit, wherein a withstanding voltage of the low withstand voltage circuit is less than a withstanding voltage of a high withstand voltage circuit to which the writing voltage is provided; and a control circuit configured to enable the nonvolatile memory to store the data therein in accordance with the protection state of the protection operation circuit upon an input voltage at the power supply terminal being greater than a determination threshold voltage for determining the writing voltage.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

In the following, embodiments will be described with reference to accompanied drawings.

Figure 1:
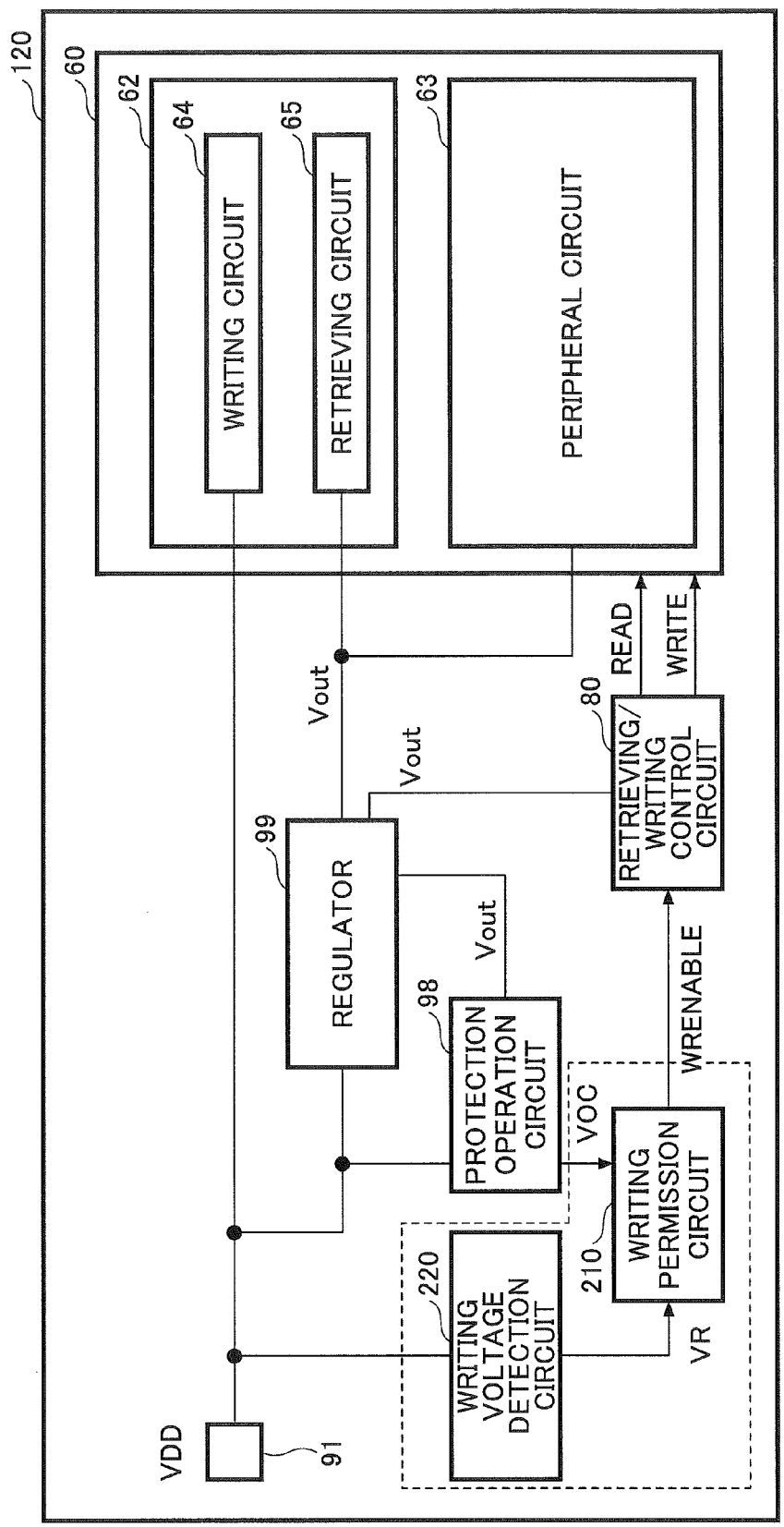
FIG. 1 is a diagram for illustrating a configuration of a secondary battery protection circuit.

FIG. 1 is a diagram for illustrating a configuration of a protection circuit 120. The protection circuit 120 is an example of a secondary battery protection circuit for protecting the secondary battery.

For example, the protection circuit 120 includes a memory 60 and a protection operation circuit 98. The memory 60 is an example of a nonvolatile memory capable of having parameter data for defining a specification of the protection circuit 120 written therein with a writing voltage supplied at the power supply terminal 91 of the protection circuit 120. The power supply terminal 91 is a terminal for receiving power supply voltage of the protection circuit 120, and a terminal for receiving a writing voltage required to write the parameter data into the memory 60.

An OTPROM (One Time Programmable ROM), an EEPROM (Electrically Erasable Programmable ROM), etc., are exemplified as the memory 60. The protection operation circuit 98 is an example of a protection operation circuit for protecting the secondary battery based on the parameter data retrieved from the memory 60. For example, the protection operation circuit 98 monitors a state of the secondary battery to generate a signal for turning on/off conduction of a current path (power supply path) between the secondary battery and a load based on the state of the secondary battery, thereby protecting the secondary battery.

Threshold voltage data such as an overcharge detection voltage Vdet1, an overcharge recovery voltage Vrel1, an over discharge detection voltage Vdet2, an over discharge recovery voltage Vrel2, a discharge overcurrent detection voltage Vdet3, a charge overcurrent detection voltage Vdet4, a short-circuiting detection voltage Vshort, or a standby threshold voltage Vstb is exemplified as the parameter data. Also, delay time data such as an overcharge detection delay time tVdet1, an overcharge recovery delay time tVrel1, an over discharge detection delay time tVdet2, an over discharge delay time voltage tVrel2, a discharge overcurrent delay time voltage tVdet3, a discharge overcurrent recovery delay time tVrel3, a discharge overcurrent detection delay reset time tVd3rst, a charge overcurrent detection delay time tVdet4, a charge overcurrent recovery delay time tVrel4, or a short-circuiting detection delay time tshort is exemplified as the parameter data.

Therefore, a common circuit configuration can be adapted to discrete specifications since a protection operation preformed on the secondary battery can be changed by changing the parameter data written in the memory 60. For example, the protection operation circuit 98 can be made common even if the type of the secondary battery 200 or a product in which the protection circuit 120 is installed is varied.

Also, for example, change of metal lines arrangement in an IC chip or laser trimming of a fuse for customizing the specification is not required since the protection circuit 120 includes a memory 60 capable of having written the parameter data written therein is provided. As a consequence, a lead time and a cost for development and manufacturing can be reduced.

The memory 60 includes a memory cell circuit 62 and a peripheral circuit 63 disposed on the periphery of the memory cell circuit 62. The memory cell circuit 62 includes a writing circuit 64 for writing the parameter data input from a certain writing terminal into memory elements and a retrieving circuit 65 for retrieving the parameter data from the memory elements. The peripheral circuit 63 includes a logic circuit for controlling the writing operation of the writing circuit 64 and the retrieving operation of the retrieving circuit 65.

The protection circuit 120 includes a regulator 99. In a case where an input voltage VDD is less than a predetermined constant voltage VREG, the regulator 99 outputs the input voltage VDD as an output voltage Vout. In a case where the input voltage VDD is greater than the predetermined constant voltage VREG, the regulator 99 outputs the constant voltage VREG as the output voltage Vout.

The output voltage Vout is supplied to circuits (for example, circuits other than the writing circuit 64, or a writing voltage detection circuit 220) which do not require a high voltage. Thus, area of circuit can be reduced since unnecessary high voltage withstanding elements are not required. And, the input voltage VDD is output as it is when the input voltage VDD is less than a predetermined constant voltage VREG (for example, when the protection circuit 120 operates in a normal state), while the constant voltage VREG is output when the the input voltage VDD is greater than a predetermined constant voltage VREG. Therefore, particular high voltage withstanding elements are not required since a range of operational voltage of the protection circuit 120 does not fall due to a voltage reduction of the secondary battery conductively connected to the power supply terminal 91 while the output voltage is clamped to the predetermined constant voltage VREG when the writing voltage is input at the power supply terminal 91. For example, the writing voltage is 9 V, while the predetermined constant voltage VREG is a nominal voltage (for example, 3.6V) of the secondary battery conductively connected to the power supply terminal 91.

The output voltage Vout is supplied from the regulator 99 to the retrieving circuit 65 and the peripheral circuit 63 since the retrieving circuit 65 and the peripheral circuit 63 are operated with a normal operational voltage of the protection circuit 120. The output voltage Vout is also supplied to a retrieving/writing control circuit 80 and the protection operation circuit 98.

Meanwhile, the memory elements in the writing circuit 64 require a voltage greater than the normal operational voltage of the protection circuit 120 and the memory 60 when writing the parameter data since the writing operation is performed by causing breakdown of the memory elements. Therefore, the writing circuit 64 writes the parameter data input from writing terminals into the memory elements by receiving the writing voltage greater than the predetermined constant voltage VREG.

The writing voltage greater than the normal operational voltage of the protection circuit 120 and the memory 60 may be input at the power supply terminal 91 since the regulator 99 regulates the input voltage VDD at the power supply terminal 91 to the predetermined constant voltage VREG. Even if the writing voltage is input at the power supply terminal 91, the regulator 99 outputs the constant voltage VREG by regulating the writing voltage input at the power supply terminal 91. Thus, the writing voltage input at the power supply terminal 91 can be supplied to the writing circuit 64, and the constant voltage VREG less than the writing voltage input at the power supply terminal 91 can be provided to the retrieving circuit 65 and the peripheral circuit 63. Also, by providing the regulator 99, a designated terminal for receiving the writing voltage other than the power supply terminal 91 is not required, thereby suppressing enlargement of circuit size of the protection circuit 120 due to increase of the terminals.

The protection circuit 120 includes a writing voltage detection circuit 220. The writing voltage detection circuit 220 monitors the input voltage VDD to determine whether the input voltage VDD is greater than a determination threshold voltage VRth for determining the writing voltage. Ina case where the input voltage VDD is greater than the determination threshold voltage VRth, the writing voltage detection circuit 220 determines that the input voltage VDD is not the normal power supply voltage but the writing voltage and sets a level of a detection signal VR to be an active level (for example, a high level). Meanwhile, in a case where the input voltage VDD is equal to or less than the determination threshold voltage VRth, the writing voltage detection circuit 220 determines that the input voltage VDD is not the writing voltage but the normal power supply voltage and sets the level of the detection signal VR to be a non-active level (for example, a low level).

The protection circuit 120 includes the protection operation circuit 98 for detecting a state of the secondary battery through the power supply terminal 91. The protection operation circuit 98 performs an appropriate protection operation according to the state detected through the power supply terminal 91 on the secondary battery based on the parameter data retrieved from the memory 60.

The protection circuit 120 includes a writing permission circuit 210. The writing permission circuit 210 is an example of a control circuit for enabling to write data into the memory 60 based on a detection signal VR from the writing voltage detection circuit 220 and a protection state signal of the protection operation circuit 98. When the input voltage VDD is changed from the normal power supply voltage into the writing voltage, the detection signal VR output from the writing voltage detection circuit 220 becomes active. A state of the protection circuit 120 transitions from a state where it detects the state of the secondary battery to an overcharge protection state. Thus, the writing permission circuit 210 can prevent the memory 60 from being erringly written with the power supply voltage less than the writing voltage, where the writing permission circuit 210 sets the state of the memory 60 to be writable by using logical AND of the detection signal VR and the protection state signal of the protection operation circuit 98 in order to determine whether to enable the memory 60 to have data written therein.

For example, the protection state of the protection circuit 120 corresponds to a state where the protection operation circuit 98 of the protection circuit 120 detects the overcharge of the secondary battery based on the overcharge detection voltage Vdet1 and, after passing a certain time, performs the overcharge protection (overcharge protection state). The overcharge detection voltage Vdet1 is an example of a threshold voltage for detecting the overcharge of the secondary battery, and it is set to be less than the writing voltage. The protection operation circuit 98 of the protection circuit 120 detects the overcharge of the secondary battery based on the relation of magnitude between the input voltage VDD and the overcharge detection voltage Vdet1.

Therefore, when the writing voltage is input at the power supply terminal 91, the protection operation circuit 98 detects the overcharge of the secondary battery since the writing voltage is greater than the overcharge detection voltage Vdet1, and the protection state of the protection circuit 120 is transitioned into the overcharge protection state. Meanwhile, the normal power supply voltage is input at the power supply terminal 91, the protection operation circuit 98 does not detect the overcharge of the secondary battery since the normal power supply voltage is less than the overcharge detection voltage Vdet1, and the protection state of the protection circuit 120 is not transitioned into the overcharge protection state.

Thus, by using not only the detection signal VR output from the writing voltage detection circuit 220 but also the overcharge protection state in determining whether to enable the memory 60 to have data written therein, the writing permission circuit 210 can more surely prevent the memory 60 from being erringly enabled to have data written therein with the power supply voltage less than the writing voltage.

For example, in a case where the detection signal VR output from the writing voltage detection circuit 220 is in an active state and the state of the protection operation circuit 98 included in the protection circuit 120 is in the overcharge protection state, the overcharge protection signal output from the protection operation circuit 98 becomes active, and the writing permission circuit 210 sets a level of write enable signal WRENABLE for enabling the memory 60 to have the parameter data written therein to be an active level (for example; the high level). Thus, the memory 60 is enabled to have data such as the parameter data written therein, and the retrieving/writing control circuit 80 can write the data such as the parameter data into the memory 60.

Figure 2:
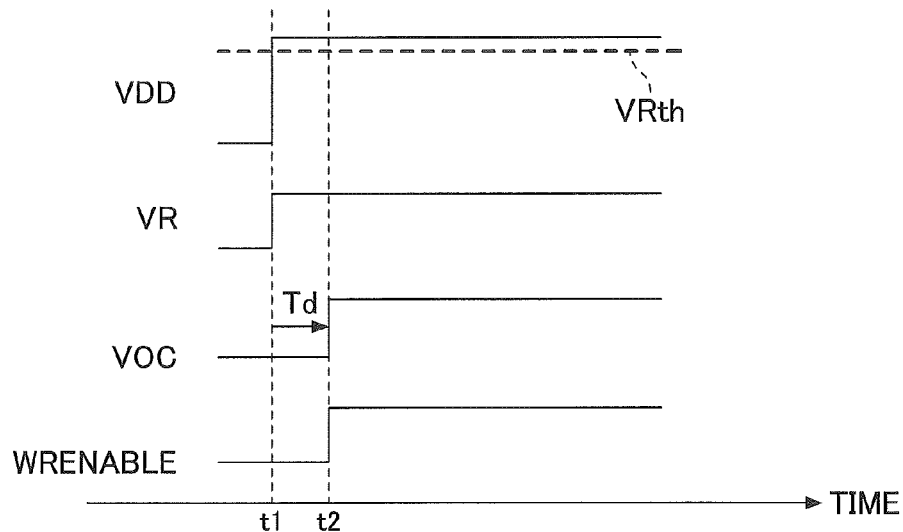
FIG. 2 is a timing diagram for illustrating an example operation of the overcharge detection protection circuit.

FIG. 2 is a timing diagram for illustrating an example operation of the protection circuit 120. In a case where the input voltage VDD greater than the determination threshold voltage VRth is detected at a timing t1, the writing voltage detection circuit 220 turns the level of the detection signal VR from the low level into the high level. Meanwhile, in a case where the input voltage VDD greater than the overcharge detection voltage Vdet1 is detected, the protection operation circuit 98 determines the secondary battery to be overcharged. The protection operation circuit 98 outputs an overcharge protection signal VOC at the active level indicating to perform an operation to protect the secondary battery from the overcharge after passing a delay time Td from the detection of the overcharge of the secondary battery. For example, the protection operation circuit 98 turns the level of the overcharge protection signal VOC from the non-active level (for example, low level) into the active level (for example, high level) at a timing t2. For example, the delay time Td is the overcharge detection delay time tVdet1 described below.

The writing permission circuit 210 turns the level of the write enable signal WRENABLE from the non-active level into the active level at the timing t2 when both of the levels of the detection signal VR and the overcharge protection signal VOC are detected to be active. After the timing t2, where the write enable signal WRENABLE is at the active level, the protection operation circuit 98 performs the operation to protect the secondary battery from the overcharge and the memory 60 is enabled to have the data written therein. That is, the protection operation circuit 98 is operated so as to protect the secondary battery from the overcharge when the memory 60 is enabled to have the data written therein.

Figure 3:
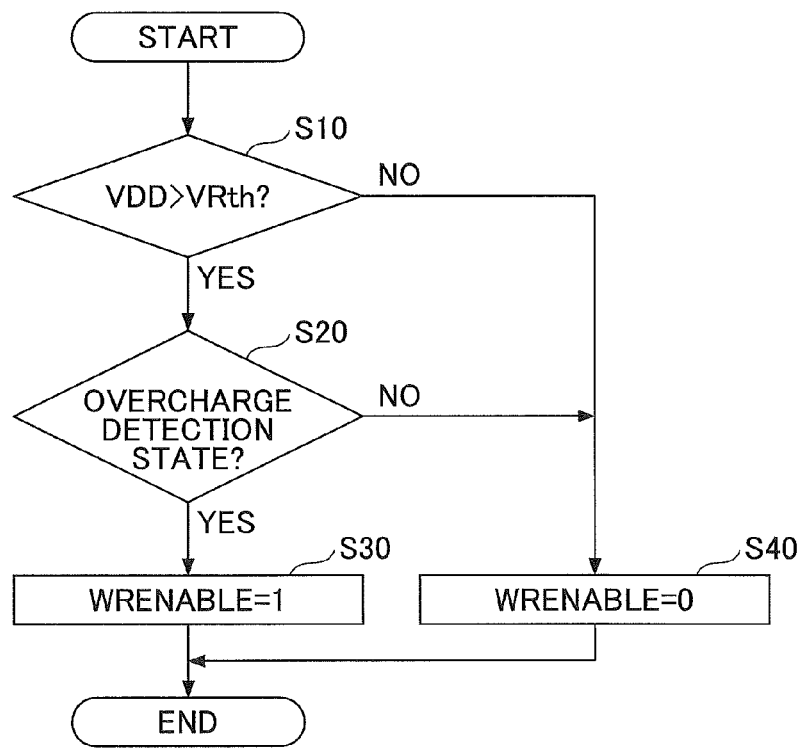
FIG. 3 is a flowchart for illustrating an example operation of the overcharge detection protection circuit.

FIG. 3 is a flowchart for illustrating an example operation of the protection circuit 120. A sequence of performing processes of step S10 and step S20 may be switched.

In step S10, the writing permission circuit 210 determines whether the input voltage VDD is greater than the determination threshold voltage VRth based on the detection signal VR output from the writing voltage detection circuit 220. The writing permission circuit 210 determines the input voltage VDD to be the writing voltage greater than the determination threshold voltage VRth in a case where the level of the detection signal VR is high level, while it determines the input voltage VDD to be the normal power supply voltage less than the determination threshold voltage VRth (power supply voltage less than writing voltage) in a case where the level of the detection signal VR is low level.

In step S20, the writing permission circuit 210 determines whether the state of the protection circuit 120 is the overcharge detection state based on the overcharge protection signal VOC output from the protection operation circuit 98. The writing permission circuit 210 determines the state of the protection circuit 120 to be overcharge detection state in a case where the level of the overcharge protection signal VOC is high level, while it determines the state of the protection circuit 120 not to be overcharge detection state in a case where the level of the overcharge protection signal VOC is low level.

In a case where the input voltage VDD is detected to be greater than the determination threshold voltage VRth and the state of the protection circuit 120 is detected to be the overcharge detection state, in step S30, the writing permission circuit 210 sets the level of the write enable signal to be the active level (for example, "1"). Meanwhile, in a case where the input voltage VDD is detected to be equal to or less than the determination threshold voltage VRth and/or the state of the protection circuit 120 is detected to not be the overcharge detection state, in step S40, the writing permission circuit 210 sets the level of the write enable signal to be the non-active level (for example, 0).

Figure 4:
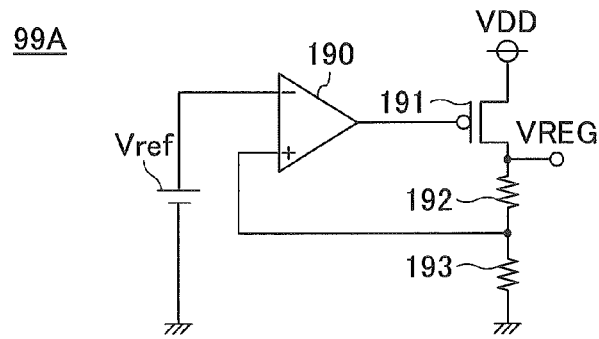
FIG. 4 is a diagram for illustrating an example configuration of a regulator.

FIG. 4 is a diagram for illustrating a configuration of a regulator 99A which is an example of the regulator 99. The regulator 99A is an example of a voltage generation circuit for outputting the input voltage VDD in a case where the input voltage VDD is less than the predetermined constant voltage VREG while generating the constant voltage VREG and outputting it in a case where the input voltage VDD is greater than the predetermined constant voltage VREG. The regulator 99A clamps the constant voltage VREG at a voltage less than the writing voltage. For example, the regulator 99A includes an operational amplifier 190, an output transistor 191 and resistors 192 and 193.

A circuit in which the output transistor 191 and the resistors 192 and 193 are connected in series is connected in series between a potential of the input voltage VDD and the ground potential. The operational amplifier 190 includes an inverted input terminal at which a certain reference voltage Vref is provided, a non-inverted terminal at which a divided voltage output from a divided voltage output point located between the resistor 192 and the resistor 193 is provided and an output terminal for outputting an output signal for driving a gate of the output transistor 191. The output transistor 191 is an enhancement type P-channel MOS transistor which outputs the constant voltage VREG from a drain thereof.

Figure 5:
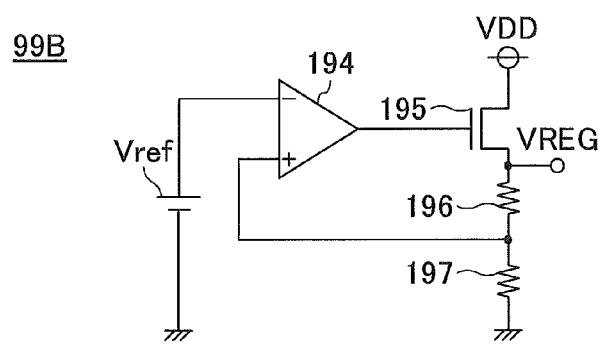
FIG. 5 is a diagram for illustrating another example configuration of a regulator.

FIG. 5 is a diagram for illustrating a configuration of a regulator 99B which is another example of the regulator 99. The regulator 99B is an example of a voltage generation circuit for outputting the input voltage VDD in a case where the input voltage VDD is less than the predetermined constant voltage VREG while generating the constant voltage VREG and outputting it in a case where the input voltage VDD is greater than the predetermined constant voltage VREG. The regulator 99B clamps the constant voltage VREG at a voltage less than the writing voltage. For example, the regulator 99B includes an operational amplifier 194, an output transistor 195 and resistors 196 and 197.

A circuit in which the output transistor 195 and the resistors 196 and 197 are connected in series is connected in series between a potential of the input voltage VDD and the ground potential. The operational amplifier 194 includes an inverted input terminal at which a certain reference voltage Vref is provided, a non-inverted terminal at which a divided voltage output from a divided voltage output point located between the resistor 196 and the resistor 197 is provided and an output terminal for outputting an output signal for driving a gate of the output transistor 195. The output transistor 195 is a depletion type n-channel MOS transistor which outputs the constant voltage VREG from a source thereof.

Figure 6:
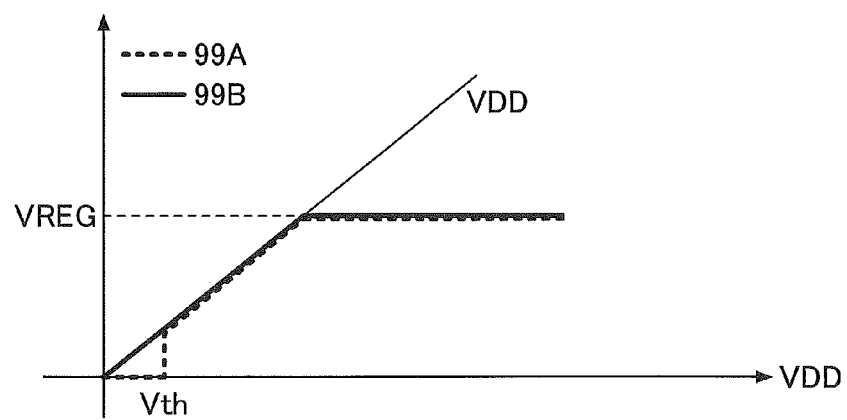
FIG. 6 is a diagram for illustrating an example relationship between an input voltage VDD at a power supply terminal and a voltage generated by the regulator.

FIG. 6 is a diagram for illustrating an example relationship between the input voltage VDD and the constant voltage VREG generated based on the input voltage VDD in the regulator 99A and the regulator 99B. The regulator 99A does not operate in a case where the input voltage VDD is less than a threshold voltage Vth of the output transistor 191. Meanwhile, the regulator 99B can operate even when the input voltage VDD is 0 V since the output transistor 195 is the depletion type transistor whose threshold voltage Vth is equal to or less than 0 V. Therefore, in a case where the input voltage VDD is greater than or equal to 0 V and less than the predetermined constant voltage VREG, the output voltage Vout which is almost equal to the input voltage VDD is output. Thus, for example, the protection operation circuit 98 can obtain electric power for operating even when the input voltage VDD is significantly low, thereby controlling the prevention and the permission of the charge of the secondary battery whose voltage is significantly low.

Figure 7:
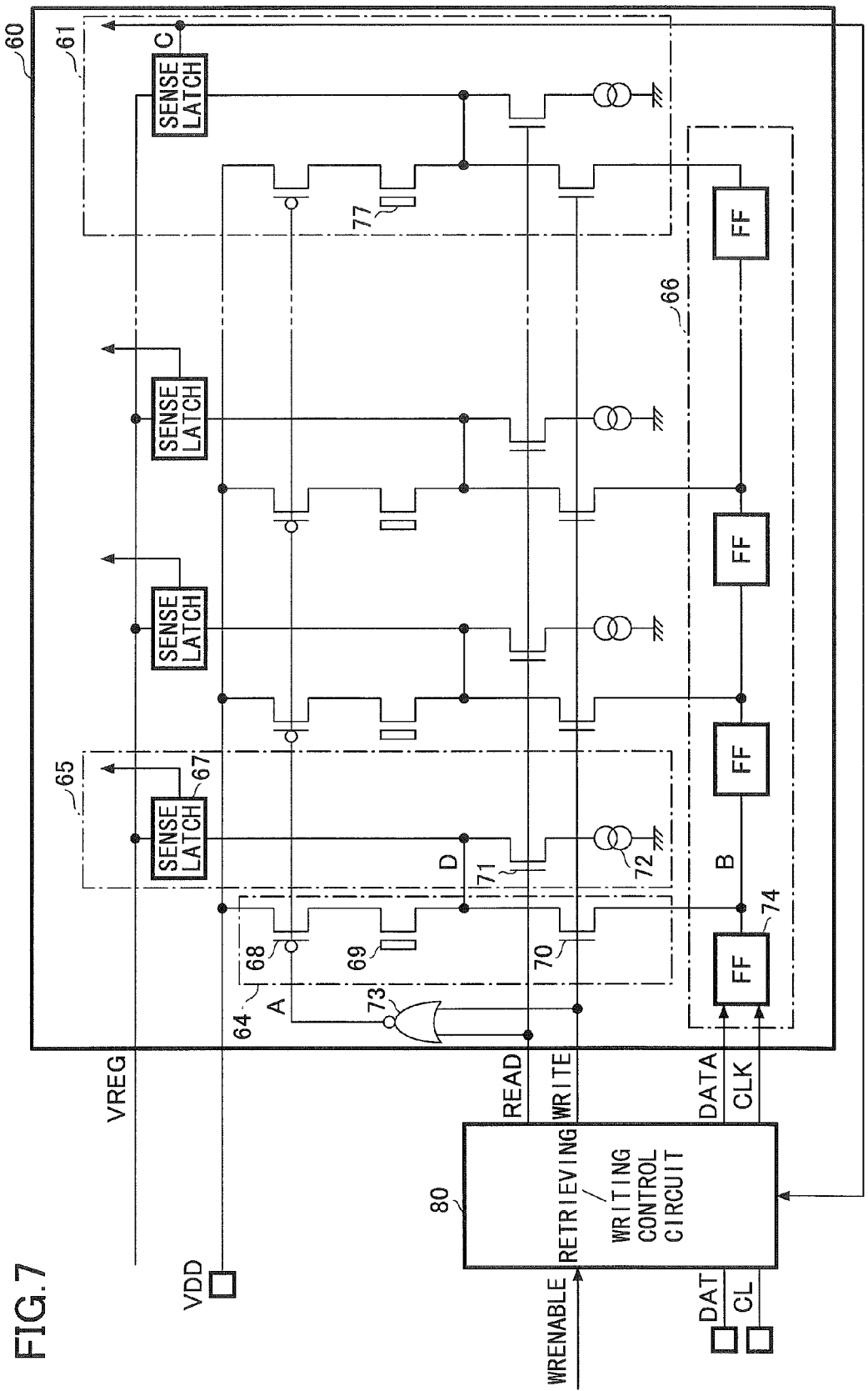
FIG. 7 is a diagram for illustrating an example configuration of the nonvolatile memory.

FIG. 7 is a diagram for illustrating an example configuration of the memory 60. The memory 60 includes a plurality of writing circuits 64 to which the writing voltage is provided, a plurality of retrieving circuits 65 to which the constant voltage VREG is provided, a NOR gate 73 and a shift register 66. The NOR gate 73 and the shift register 66 are included in the peripheral circuit 63. The shift register 66 includes a sequential circuit in which flip-flops (FF) 74 are connected in series. In FIG. 7, a writing circuit 64 and a retrieving circuit 65 are respectively shown as parts surrounded by chain lines.

The respective writing circuits 64 include a circuit in which a switch 68, a memory element 69 and a switch 70 are connected in series. The switch 68 is disposed between a feeding path of the writing voltage and the memory element 69, and the switch 70 is disposed between an output part of the flip-flop 74 included in the shift register 66 and the memory element 69. For example, the switch 68 is a P-channel MOSFET, the memory element 69 is a OTP (One Time Programmable) element and the switch 70 is a N-channel MOSFET.

The respective retrieving circuits 65 include a sense latch circuit 67, a switch 71 and a constant current source 72. For example, the sense latch circuit 67 is a flip-flop, and the switch 71 is a N-channel MOSFET.

The retrieving/writing control circuit 80 converts a parameter data signal DAT for conveying the parameter data into a parameter data internal signal DATA and converts a clock signal CL provided from an external device into a clock internal signal CLK. Also, the retrieving/writing control circuit 80 generates a write signal (WRITE) for instructing to write the parameter data into the memory elements 69 based on the parameter data signal DAT and the clock signal CL. Also, the retrieving/writing control circuit 80 generates a read signal (READ) for retrieving the parameter data from the memory elements 69 when the input voltage VDD exceeds a certain start voltage.

For example, the writing circuit 64 is a high voltage withstanding circuit having a higher breakdown voltage than that of the retrieving circuit 65 since the writing voltage greater than the constant voltage VREG is applied (provided) to the writing circuit 64. In this case, the retrieving circuit 65 and the peripheral circuit 63 are low voltage withstanding circuits having a lower breakdown voltage than that of the writing circuit 64, and the constant voltage VREG is applied to them.

Figure 8:
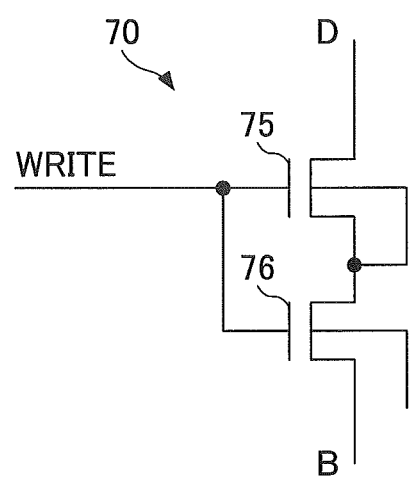
FIG. 8 is a diagram for illustrating an example configuration of the switch.

FIG. 8 is a diagram for illustrating an example configuration of the switch 70 having a high breakdown voltage configuration in the writing circuit 64. The switch 70 is a series circuit in which the MOSFET 75 and the MOSFET 76 are stacked. A signal WRITE from the retrieving/writing control circuit 80 is input at the respective gates of the MOSFETs 75 and 76. As shown in FIG. 8, since a connection point of a back gate of the MOSFET 75 is different from that of the MOSFET 76, a high voltage between "D" and "B" can be divided into a voltage between a source and a drain of the MOSFET 75 and a voltage between a source and a drain of the MOSFET 76.

Figure 9:
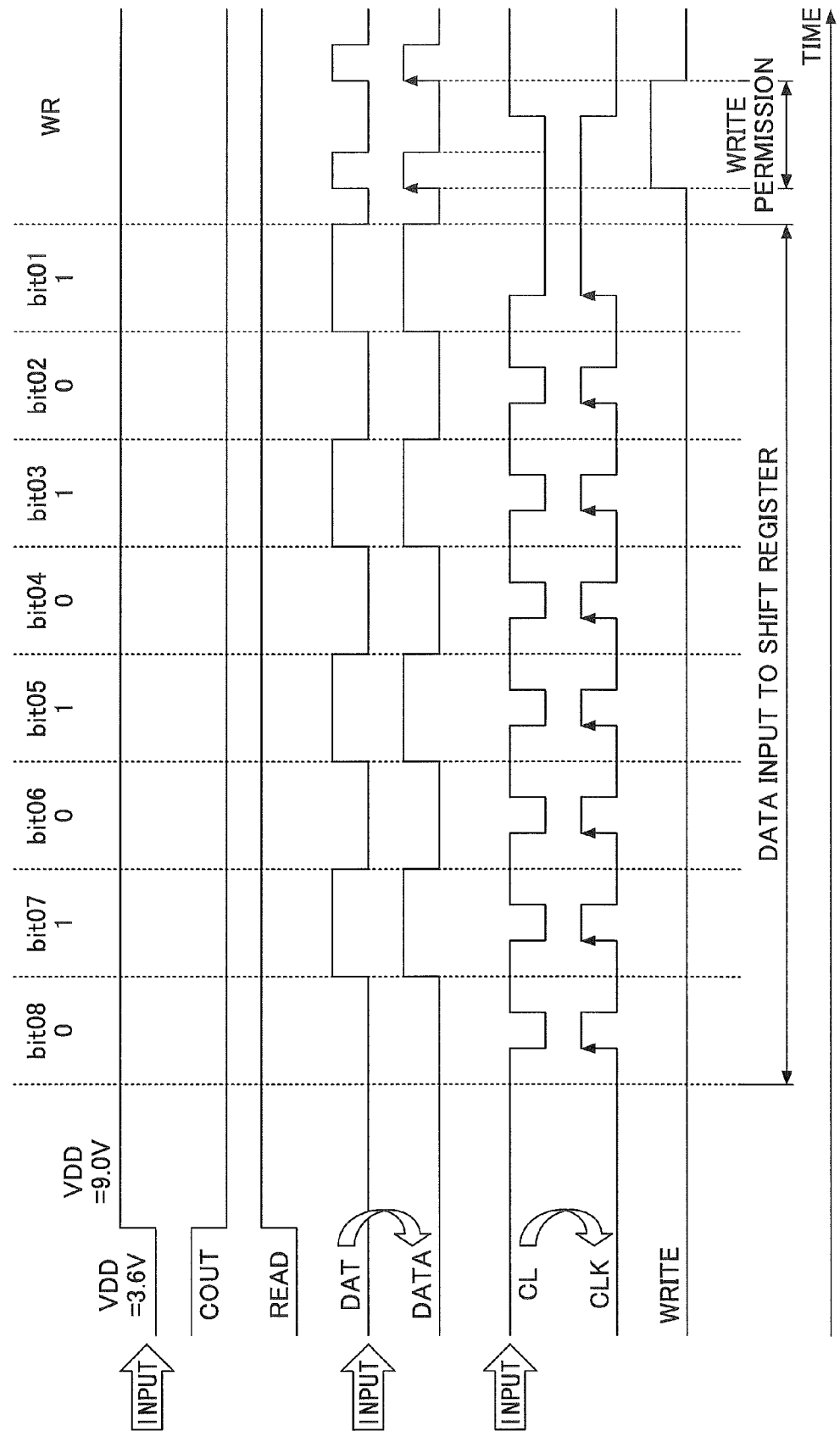
FIG. 9 is a timing diagram for illustrating an example writing operation.

In the following, an example operation performed with the configuration shown in FIG. 7 is described with reference to FIG. 9. FIG. 9 is a timing diagram for illustrating an example operation performed with the configuration shown in FIG. 1 and FIG. 7.

In an initial state, respective levels of "READ" and "WRITE" are low (READ=WRITE=L). In this case, the switch 68 is turned off since a gate potential A of the switch 68 is high level. The switch 70 is turned off since output potentials B of the respective flip-flops 74 in the shift register 66 are high level. Therefore, in the initial state, the state of the memory element 69 is unrecorded state which indicates the parameter data has not been written therein.

When performing the writing operation, the input voltage VDD is increased from a normal operational voltage (for example, 3.6 V) to the writing voltage (for example, 9 V). When the writing voltage VDD is increased, the overcharge detection circuit 22 detects it. Then, a level of a control signal output from the charge control terminal 93 to the gate of the transistor 11 is changed from a high level by which the transistor 11 is turned on into a low level by which the transistor 11 is turned off. Meanwhile, a control signal output from the discharge control terminal 94 to the gate of the transistor 12 remains at high level.

In response to providing the parameter data internal control signal DATA and the clock internal signal CLK from the retrieving/writing control circuit 80 to the shift register 66, the respective flip-flops 74 output a signal at low level according to the input parameter data internal signal DATA.

In a write permission period for permitting to write the parameter data into the memory element 69, since a level of "READ" is low level (READ=L) and a level of "WRITE" is high level (WRITE=H), the gate potential A of the switch 68 is low level. In the write permission period, the switch 68 is turned on, the switch 71 is turned off and the switch 70 is turned on.

In a case where the output potential B of the shift register 66 is low level in the write permission period, the writing voltage is applied to the memory element 69 which causes current to flow through the memory element 69 in an off state. Thus, electrons are trapped in a floating gate of the memory element 69 which causes the memory element 69 to be in on state (parameter data is written into memory element 69).

Meanwhile, in a case where the output potential B of the shift register 66 is high level in the write permission period, the switches 68 and 70 are turned on, however, the current does not flow through the memory element 69 since a voltage between a drain and a source of the memory element 69 is almost 0 V. That is, the state of the memory element 69 remains to be off (parameter data is not written into the memory element 69).

The retrieving/writing control circuit 80 turns off the switch 70 by turning the level of "WRITE" into the low level. Thus, the write permission period is ended.

In the following, an example operation with the configuration shown in FIG. 7 is described.

When performing the retrieving operation, the input voltage VDD is the normal operational voltage (for example, 3.6 V). The retrieving/writing control circuit 80 has the gate potential A of the switch 68 be low level by turning the level of "READ" into the high level. That is, in a read permission period for retrieving the parameter data from the memory element 69, the switch 68 is turned on, the switch 71 is turned on, and the switch 70 is turned off.

In a case where the parameter data has not been written into the memory element 69, the sense latch circuit 67 latches an memory output potential D at a low level in the read permission period. In a case where the parameter data has been written into the memory element 69, the sense latch circuit 67 latches a memory output potential D at a high level in the read permission period.

The retrieving/writing control circuit 80 turns the level of "READ" into the low level to turn the gate potential A into the high level, thereby turning the switch 68 off. Thus, the read permission period is ended.

Additionally, the retrieving/writing control circuit 80 sets a period where the write enable signal WRENABLE is at active level (in this embodiment, high level) to be the write permission period.

As shown in FIG. 7, the memory 60 may include a write prevention circuit 61 for preventing data writing after the parameter data has been written. Rewriting the parameter data stored in the memory 60 can be prevented by a write prevention operation of the write prevention circuit 61. Also, in a case where the parameter data has been written into a part of the memory elements 69 among all the memory elements 69 and it has not been written into other memory elements 69, writing data into the other memory elements 69 in which the parameter data has not been written can be prevented.

For example, as shown in FIG. 7, the write prevention circuit 61 has the same circuit configuration as that of the writing circuit 64 and the retrieving circuit 65 and it includes a protection bit 77. Data is written into the protection bit 77 at the last timing of writing operation for writing the parameter data into the memory elements 69 based on "WRITE" output from the retrieving/writing control circuit 80. After the data is written into the protection bit 77, the write prevention circuit 61 outputs a write lock signal for disabling the writing operation for writing the parameter data into the memory element 69 to the retrieving/writing control circuit 80. For example, the retrieving/writing control circuit 80 has the level of "WRITE" be fixed at low level in response to input of the write lock signal. Thus, the writing operation for writing the parameter data into the memory element 69 is disabled. The retrieving/writing control circuit 80 may have the level of "WRITE" be fixed at low level and disable a write signal including at least one of the parameter data signal DAT and the clock signal CL in response to input of the write lock signal.

Figure 10:
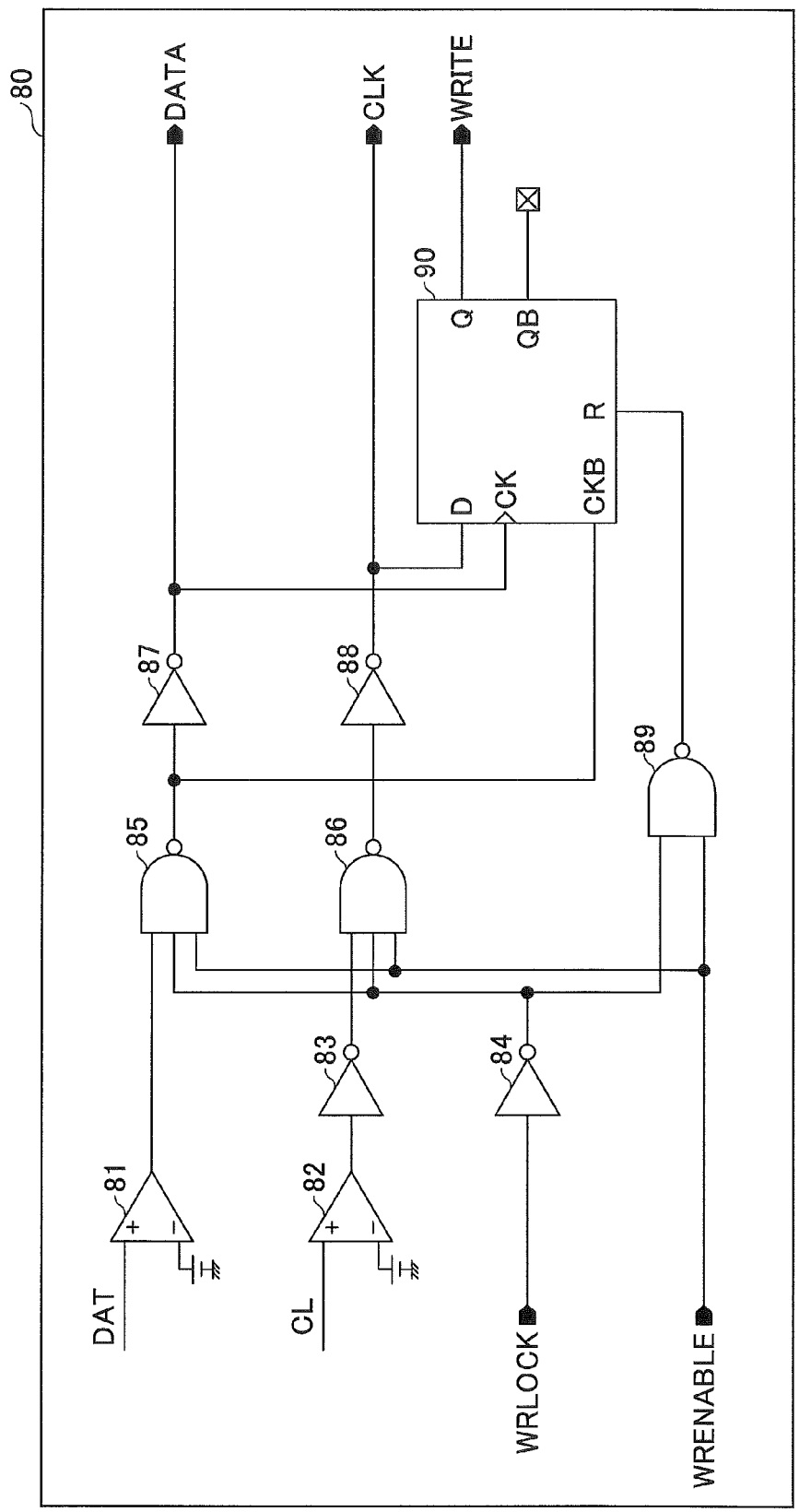
FIG. 10 is a diagram for illustrating an example configuration of the retrieving/writing control circuit.

FIG. 10 is a diagram for illustrating an example configuration of the retrieving/writing control circuit 80. The write lock signal (WRLOCK) is output from an output point C (see FIG. 7) of the sense latch circuit 67 of the write prevention circuit 61. The write enable signal WRENABLE is at low level when the input voltage VDD is the normal operational voltage, while it is at high level when the input voltage VDD is the writing voltage and the state of the protection circuit 120 is overcharge detection state.

The retrieving/writing control circuit 80 includes a comparator 81 to which the parameter data DAT is input and a comparator 82 to which the clock signal CL is input. Also, the retrieving/writing control circuit 80 includes a read/write logic circuit for generating the parameter data internal signal DATA, the clock internal signal CLK and "WRITE" based on the parameter data signal DAT, the clock signal CL, the write lock signal WRLOCK and the write enable signal WRENABLE. For example, the read/write logic circuit includes inverters 83, 84, 87 and 88, NAND gates 85, 86 and 89, and a flip-flop 90.

In a case where the input voltage VDD is equal to the writing voltage and the data has not been written in the protection bit 77, the level of "WRLOCK" becomes low level due to the level (low) of the output point C and the level of "WRENABLE" becomes high level. In this case, the flip-flop 90 operates since a signal at the low level is provided at a reset terminal R of the flip-flop 90 through the inverter 84 and the NAND gate 89. "WRITE" at the high level is output based on a combination of the parameter data signal DAT and the clock signal CL as described above. Thus, the writing operation for writing data into the memory element 69 is enabled.

Meanwhile, in a case where the input voltage VDD is equal to the writing voltage and the data has been written in the protection bit 77, the level of "WRLOCK" becomes high level due to the level (high) of the output point C and the level of "WRENABLE" becomes high level. In this case, the flip-flop 90 does not operate since a signal at the high level is provided at a reset terminal R of the flip-flop 90 through the inverter 84 and the NAND gate 89. That is, "WRITE" output from a Q terminal of the flip-flop 90 is fixed at the low level. Also, the parameter data internal signal DATA output from the inverter 87 and the clock internal signal CLK output from the inverter 88 are fixed at the low level since the signal at the low level is input to the NAND gates 85 and 86. Therefore, "WRITE" output from the Q terminal of the flip-flop 90 is fixed at the low level. Thus, writing into the memory element 69 is prevented.

Figure 11:
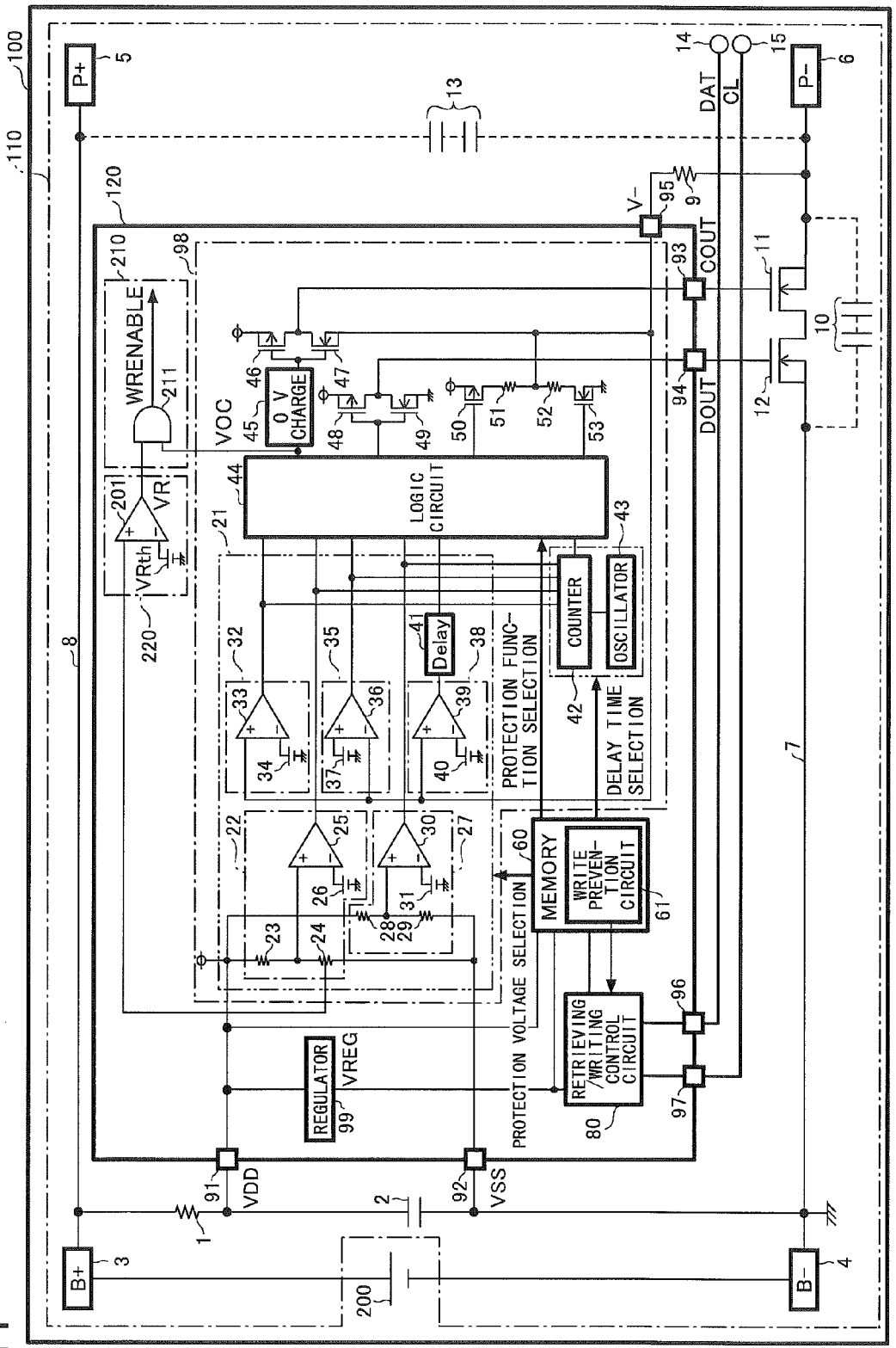
FIG. 11 is a diagram for illustrating an example configuration of a battery pack.

FIG. 11 is a diagram for illustrating an example configuration of a battery pack 100. The battery pack 100 includes a secondary battery 200 capable of supplying electric power to an external load (not shown) connected to load connection terminals 5 and 6 and a protection device 110 for protecting the secondary battery 200. The battery pack 100 may be internally included in the external load or may be externally attached to the external load. A mobile terminal device is exemplified as the external load. Electronic apparatuses such as a mobile phone, a smart phone, a tablet computer, a game console, a TV, a music or movie player, or a camera are exemplified as the mobile terminal device.

The secondary battery 200 can be charged with a battery charger (not shown) connected to the load connection terminals 5 and 6. A lithium-ion battery, a lithium polymer battery, etc., are exemplified as the secondary battery 200.

The protection device 110 includes the load connection terminal 5, the load connection terminal 6, cell connection terminals 3 and 4, and it is an example of a secondary battery protection device for protecting the secondary battery 200 connected to the cell connection terminals 3 and 4 from the overcurrent, etc. The cell connection terminal 3 is connected to the load connection terminal 5 through a power supply path 8. The cell connection terminal 4 is connected to the load connection terminal 6 through a power supply path 7. The cell connection terminal 3 is connected to a positive electrode of the secondary battery 200. The cell connection terminal 4 is connected to a negative electrode of the secondary battery 200.

The protection device 110 includes transistors 11 and 12. The transistor 11 is an example of a charge path shutoff unit capable of shutting off a charge path of the secondary battery 200, and the transistor 12 is an example of discharge path shutoff unit capable of shutting off a discharge path of the secondary battery 200. In the example shown in FIG. 11, the transistor 11 can shut off the power supply path 7 to stop charge current of the secondary battery 200 flowing through it, and the transistor 12 can shut off the power supply 7 to stop discharge current of the secondary battery 200 flowing through it. The transistor 11 and 12 are switching elements capable of switching conductive state/conduction cut-off state of the power supply path 7, and are connected in series with the power supply path 7.

For example, the transistor 11 and 12 are MOSFETs (Metal Oxide Semiconductor Field Effect Transistor). The transistor 11 is connected with the power supply path 7 so that a forward direction of a parasitic diode of the transistor 11 is coincident with a discharge direction of the secondary battery 200. The transistor 12 is connected with the power supply path 7 so that a forward direction of a parasitic diode of the transistor 12 is coincident with a charge direction of the secondary battery 200. A diode may be disposed between the drain and the source of the transistor 11 and/or 12.

The protection device 110 may include capacitors 10 and 13. The capacitor 10 is connected in parallel with a circuit in which the transistor 11 and the transistor 12 are connected in series. The capacitor 13 includes one end connected to the load connection terminal 5 and the other end connected to the load connection terminal 6. Tolerance to a change in voltage or an external noise can be improved by disposing the capacitor 10 or the capacitor 13.

The protection device 110 includes a protection circuit 120. The protection circuit 120, which does not include a CPU (Central Processing Unit), is an example of a secondary battery protection circuit for protecting the secondary battery 200, and for example, it is an integrated circuit for protecting the secondary battery 200 powered by the secondary battery 200. Since the protection circuit 120 does not include the CPU, naturally, the protection circuit 120 does not have a function for protecting the secondary battery 200 based on a processing result of the CPU. Also, the protection circuit 120 does not have a function for detecting remaining charge amount of the battery 200 since it does not include the CPU.

For example, the protection circuit 120 includes a power supply terminal 91, a ground terminal 92, a charge control terminal 93, a discharge control terminal 94 and a current detection terminal 95.

The power supply terminal 91 is a power supply terminal at a positive electrode side connected to a cell connection terminal 3 or a power supply path 8 through a resistor 1, and it may be referred to as a VDD terminal. For example, the power supply terminal 91 is connected to a connection point between one end of the resistor 1 and one end of a capacitor 2 whereas the other end of the resistor 1 is connected to the power supply path 8 and the other end of the capacitor 2 is connected to a power supply path 7. The other end of the capacitor 2 is connected to the power supply path 7 disposed between the cell connection terminal 4 and the transistor 12.

The ground terminal 92 is a power supply terminal at the negative electrode side connected to power supply path 7 disposed between the cell connection terminal 4 and the transistor 12, and it may be referred to as a VSS terminal.

The charge control terminal 93 is a terminal for outputting a signal for preventing the secondary battery 200 from being charged, and it may be referred to as a COUT terminal. The charge control terminal 93 is connected to a control electrode (for example, a gate in a case where the transistor is a MOSFET) of the transistor 11.

The discharge control terminal 94 is a terminal for outputting a signal for preventing the secondary battery 200 from being discharged, and it may be referred to as a DOUT terminal. The discharge control terminal 94 is connected to a control electrode (for example, a gate in a case where the transistor is a MOSFET) of the transistor 12.

The current detection terminal 95 is a terminal at which a voltage according to current flowing through the secondary battery 200 is provided, and it may be referred to as V− terminal. The current detection terminal 95 is connected to the power supply path 7 disposed between the load connection terminal 6 and the transistor 11 through the resistor 9.

The protection circuit 120 includes a data terminal 96, a clock terminal 97 and a retrieving/writing control circuit 80 in order to write the parameter data into the memory 60.

The data terminal 96 and the clock terminal 97 are input terminals for writing the parameter data. The data terminal 96 is a terminal for receiving parameter data signal DAT for conveying the parameter data to be written into the memory 60, and the clock terminal 97 is a terminal for receiving the clock signal CL.

The retrieving/writing control circuit 80 controls writing operation of the parameter data to be stored in the memory 60 based on the parameter data signal DAT and the clock signal CL. Also, the retrieving/writing control circuit 80 controls retrieving operation of the parameter data stored in the memory 60.

For example, by including the data terminal 96, the clock terminal 97 and the retrieving/writing control circuit 80, the protection circuit 120 can write the parameter data into the memory 60 in a delivery inspection after mold-packaging the protection circuit 120. Also, a variation of the specification caused by the packaging can be compensated for since the parameter data can be written in the memory 60 after the packaging.

Also, the protection device 110 may include a data input terminal 14 and a clock input terminal 15 in order to write the parameter data into the memory 60. The data input terminal 14 and the clock input terminal 15 are input terminals for writing the parameter data. The data input terminal 14 is a terminal for receiving the parameter data signal DAT, and it is connected to the data terminal 96 from outside of the protection circuit 120. The clock input terminal 15 is a terminal for receiving the clock signal CL and it is connected to the clock terminal 97 from outside of the protection circuit 120.

For example, by including the data input terminal 14 and the clock input terminal 15, the protection device 110 can write the parameter data into the memory 60 in a delivery inspection of the protection device 110 after the protection circuit 120 and the transistors 11 and 12 are mounted on a substrate. Also, a variation of the specification caused by the substrate mounting can be compensated for since the parameter data can be written in the memory 60 after the substrate mounting.

The protection operation circuit 98 includes an abnormality detection circuit 21 for detecting abnormal current or abnormal voltage in the secondary battery 200 and a logic circuit 44 for controlling on/off of the transistors 11 and 12 based on the abnormality detection result of the abnormality detection circuit 21. For example, the abnormality detection circuit 21 includes an overcharge detection circuit 22, an over discharge detection circuit 27, a discharge overcurrent detection circuit 32, a charge overcurrent detection circuit 35 and a short-circuiting detection circuit 38.

For example, the protection operation circuit 98 preforms an operation (overcharge protection operation) for protecting the secondary battery 200 from the overcharge. For example, the overcharge detection circuit 22 detects a voltage between the power supply terminal 91 and the ground terminal 92 by using resistors 23 and 24, thereby monitoring a battery voltage (cell voltage) of the secondary battery 200. The overcharge detection circuit 22 detects the overcharge of the secondary battery 200 to output an overcharge detection signal by detecting a cell voltage greater than the overcharge detection voltage Vdet1, where the overcharge detection voltage Vdet1 is set according to a threshold voltage retrieved from the memory 60. The detection of the cell voltage greater than or equal to the overcharge detection voltage Vdet1 and output of the overcharge detection signal are achieved by a reference voltage 26 and a comparator 25.

Upon detecting the overcharge detection signal, the logic circuit 44 waits until a overcharge detection delay time tVdet1 passes, and preforms a overcharge protection operation in which a control signal at the low level for turning off the transistor 11 is output from the charge control terminal 93, where the overcharge detection delay time tVdet1 is set according to delay time data retrieved from the memory 60. The overcharge of the secondary battery 200 can be prevented regardless of on/off state of the transistor 12 by turning off the transistor 11. The logic circuit 44 turns off the transistor 11 by turning off a transistor 46 and turning on a transistor 47.

Meanwhile, the overcharge detection circuit 22 detects the secondary battery 200 recovering from a overcharge state and transitioning to a normal state to output an overcharge recovery signal (or stop outputting the overcharge detection signal) by detecting a cell voltage equal to or less than the overcharge recovery voltage Vrel1, where the overcharge recovery voltage Vrel1 is set according to a threshold voltage data retrieved from the memory 60. The overcharge recovery voltage Vrel1 is less than the overcharge detection voltage Vdet1.

Upon detecting the overcharge recovery signal (or upon detecting stop of the overcharge detection signal), the logic circuit 44 outputs the control signal at the high level for turning on the transistor 11 from the charge control terminal 93. The overcharge protection operation is terminated upon the transistor 11 being turned on. The logic circuit 44 turns on the transistor 11 by turning on the transistor 46 and turning off the transistor 47.

For example, the writing voltage detection circuit 220 includes a comparator 201 for determining whether the input voltage VDD monitored by using the resistors 23 and 24 is greater than the determination threshold voltage VRth. In a case where the input voltage VDD is determined to be greater than the determination threshold voltage VRth, the comparator 201 outputs the detection signal VR at the high level. In a case where the input voltage VDD is determined to be equal to or less than the determination threshold voltage VRth, the comparator 201 outputs the detection signal VR at the low level.

The value of the input voltage VDD detected by the comparator 201 of the writing voltage detection circuit 220 by using the resistors 23 and 24 may be the same as or may be different from the value of the input voltage VDD detected by the comparator 25 of the overcharge detection circuit 22 by using the resistors 23 and 24, as long as the writing voltage detection circuit 220 can determine the input voltage VDD greater than the overcharge detection voltage Vdet1 to be the writing voltage. At least any one of resistance values of the resistors 23 and 24, and voltage values of the determination threshold voltage VRth and the reference voltage 26 is adjusted so that the writing voltage detection circuit 220 determines the input voltage VDD greater than the overcharge detection voltage Vdet1 to be the writing voltage.

For example, the writing permission circuit 210 includes a AND (logical AND) gate 211 to which the detection signal VR and the overcharge protection signal VOC are input. In a case where both of the detection signal VR and the overcharge protection signal VOC are detected to be at the high level, the writing permission circuit 210 turns the level of the write enable signal WRENABLE from the low level to the high level. Thus, the retrieving/writing control circuit 80 becomes to be able to write the data into the memory 60.

For example, the protection operation circuit 98 performs an operation (over discharge protection operation) for protecting the secondary battery 200 from the over discharge. For example, the over discharge detection circuit 27 detects a voltage between the power supply terminal 91 and the ground terminal 92 through resistors 28 and 29, thereby monitoring the battery voltage (cell voltage) of the secondary battery 200. The over discharge detection circuit 27 detects the over discharge of the secondary battery 200 to output an over discharge detection signal by detecting a cell voltage equal to or less than the over discharge detection voltage Vdet2, where the over discharge detection voltage Vdet2 is set according to a threshold voltage data retrieved from the memory 60. The detection of the cell voltage equal to or less than the over discharge detection voltage Vdet2 and output of the over discharge detection signal are achieved by a reference voltage 31 and a comparator 30.

Upon detecting the over discharge detection signal, the logic circuit 44 waits until an over discharge detection delay time tVdet2 passes, and preforms an over discharge protection operation in which a control signal at the low level for turning off the transistor 12 is output from the discharge control terminal 94, where the over discharge detection delay time tVdet2 is set according to delay time data retrieved from the memory 60. The over discharge of the secondary battery 200 can be prevented regardless of on/off state of the transistor 11 by turning off the transistor 12. The logic circuit 44 turns off the transistor 12 by turning off a transistor 48 and turning on a transistor 49.

Meanwhile, the over discharge detection circuit 27 detects the secondary battery 200 recovering from an over discharge state and transitioning to a normal state to output an over discharge recovery signal (or stop outputting the over discharge detection signal) by detecting a cell voltage greater than or equal to the over discharge recovery voltage Vrel2, where the over discharge recovery voltage Vrel2 is set according to a threshold voltage data retrieved from the memory 60. The over discharge recovery voltage Vrel2 is greater than the over discharge detection voltage Vdet2.

Upon detecting the over discharge recovery signal (or upon detecting stop of the over discharge detection signal), the logic circuit 44 outputs the control signal at the high level for turning on the transistor 12 from the discharge control terminal 94. The over discharge protection operation is terminated upon the transistor 12 being turned on. The logic circuit 44 turns on the transistor 12 by turning on the transistor 48 and turning off the transistor 49.

For example, the protection operation circuit 98 performs an operation (discharge overcurrent protection operation) for protecting the secondary battery 200 from the discharge overcurrent. For example, the discharge overcurrent detection circuit 32 detects a voltage between the current detection terminal 95 and the ground terminal 92, thereby monitoring a voltage P− between the load connection terminal 6 and the cell connection terminal 4. The discharge overcurrent detection circuit 32 detects the discharge overcurrent as abnormal current flowing through the load connection terminal 6 to output an discharge overcurrent detection signal by detecting a voltage P− greater than or equal to the discharge overcurrent detection voltage Vdet3, where the discharge overcurrent detection voltage Vdet3 is set according to a threshold voltage data retrieved from the memory 60. The detection of the voltage P− greater than or equal to the discharge overcurrent detection voltage Vdet3 and output of the discharge overcurrent detection signal are achieved by a reference voltage 34 and a comparator 33.

Upon detecting the discharge overcurrent detection signal, the logic circuit 44 waits until a discharge, overcurrent detection delay time tVdet3 passes, and preforms a discharge overcurrent protection operation in which a control signal at the low level for turning off the transistor 12 is output from the discharge control terminal 94, where the discharge overcurrent detection delay time tVdet3 is set according to delay time data retrieved from the memory 60. The discharge overcurrent flowing in the discharge direction of the secondary battery 200 can be prevented regardless of on/off state of the transistor 11 by turning off the transistor 12.

Here, the voltage P− is raised according to flow of discharge current for discharging the secondary battery 200 while the transistor 12 is turned on since the voltage is raised due to on-resistance of the transistor 12.

For example, the protection operation circuit 98 performs an operation (charge overcurrent protection operation) for protecting the secondary battery 200 from the charge overcurrent. For example, the charge overcurrent detection circuit 35 detects a voltage between the current detection terminal 95 and the ground terminal 92, thereby monitoring a voltage P− between the load connection terminal 6 and the cell connection terminal 4. The charge overcurrent detection circuit 35 detects the charge overcurrent as abnormal current flowing through the load connection terminal 6 to output a charge overcurrent detection signal by detecting a voltage P– equal to or less than the charge overcurrent detection voltage Vdet4, where the charge overcurrent detection voltage Vdet4 is set according to a threshold voltage data retrieved from the memory 60. The detection of the voltage P– equal to or less than the charge overcurrent detection voltage Vdet4 and output of the charge overcurrent detection signal are achieved by a reference voltage 37 and a comparator 36.

Upon detecting the charge overcurrent detection signal, the logic circuit 44 waits until a charge overcurrent detection delay time tVdet4 passes, and preforms a charge overcurrent protection operation in which a control signal at the low level for turning off the transistor 11 is output from the charge control terminal 93, where the charge overcurrent detection delay time tVdet4 is set according to delay time data retrieved from the memory 60. The charge overcurrent flowing in the charge direction of the secondary battery 200 can be prevented regardless of on/off state of the transistor 12 by turning off the transistor 11.

Here, the voltage P– falls according to flow of charge current for charging the secondary battery 200 while the transistor 11 is turned on since the voltage falls due to on-resistance of the transistor 11.

For example, the protection operation circuit 98 performs an operation (short-circuiting protection operation) for protecting the secondary battery 200 from the short-circuiting current. For example, the short-circuiting detection circuit 38 detects a voltage between the current detection terminal 95 and the ground terminal 92, thereby monitoring a voltage P– between the load connection terminal 6 and the cell connection terminal 4. The short-circuiting detection circuit 38 detects the short-circuiting between the load connection terminal 5 and the load connection terminal 6 to output a short-circuiting detection signal by detecting a voltage P– greater than or equal to the short-circuiting detection voltage Vshort, where the short-circuiting detection voltage Vshort is set according to a threshold voltage data retrieved from the memory 60. The detection of the voltage P– greater than or equal to the short-circuiting detection voltage Vshort and output of the short-circuiting detection signal are achieved by a reference voltage 40 and a comparator 39.

The short-circuiting detection signal is input to a delay circuit 41, then, after the short-circuiting delay time tshort passes, the short-circuiting detection signal is output from the delay circuit 41. The short-circuiting delay time tshort is set according to the delay time data retrieved from the memory 60.

Upon detecting the short-circuiting detection signal through the delay circuit 41, the logic circuit 44 preforms a short-circuiting protection operation in which a control signal at the low level for turning off the transistor 12 is output from the discharge control terminal 94. The short-circuiting current flowing in the discharge direction of the secondary battery 200 can be prevented regardless of on/off state of the transistor 11 by turning off the transistor 12.

The protection operation circuit 98 may have a function for switching an operation mode of the protection circuit 120 from a normal operation mode to a standby mode through an over discharge protection mode and from the standby mode to the normal operation mode through the over discharge protection mode.

In the normal operation mode, the logic circuit 44 outputs a control signal at the high level for turning on the transistor 11 from the charge control terminal 93 and a control signal at the high level for turning on the transistor 12 from the discharge control terminal 94. Also, in the normal operation mode, the logic circuit 44 turns off both of a transistor 50 and a transistor 53.

The over discharge protection mode is for performing the aforementioned over discharge protection operation. In the over discharge protection operation mode, the logic circuit 44 outputs the control signal for turning off the transistor 12 from the discharge control terminal 94 while it turns on the transistor 50 and turns off the transistor 53. Upon turning on the transistor 50, the current detection terminal 95 is pulled up to the power supply voltage of the power supply terminal 91 through the resistor 51. Upon the current detection terminal 95 being pulled up to the power supply voltage of the power supply terminal 91, a voltage between the load connection terminal 5 and the load connection terminal 6 becomes approximately 0 V. Therefore, an operation of the load (not shown) connected between the load connection terminals 5 and 6 can be stopped, thereby suppressing discharge current flowing from the secondary battery 200 to the load.

Also, in the over discharge protection mode, the logic circuit 44 can detect the voltage P– between the load connection terminal 6 and the cell connection terminal 4 by detecting a voltage between the current detection terminal 95 and the ground terminal 92, thereby determining whether a battery charger is connected to the load connection terminals 5 and 6.

In the over discharge protection mode, upon detecting the voltage P– greater than a standby threshold voltage Vstb, the logic circuit 44 determines that the battery charger is not connected and switches the operation mode of the protection circuit 120 from the over discharge protection mode to the standby mode. Meanwhile, in the over discharge protection mode, upon detecting the voltage P– less than the standby threshold voltage Vstb, the logic circuit 44 determines that the battery charger is connected and does not switch the operation mode of the protection circuit 120 from the over discharge protection mode to the standby mode. For example, the standby threshold voltage Vstb is set to be (VDD–0.9) or ½×VDD. VDD indicates the input voltage at the power supply terminal 91.

By transitioning the operation mode of the protection circuit 120 from the over discharge protection mode to the standby mode, further discharge of the secondary battery 200 in an over discharge state due to consumption current of the protection circuit 120 can be prevented.

For example, in a case where the battery charger is not connected and the over discharge is detected, the current detection terminal 95 is pulled up to the power supply voltage of the power supply terminal 91 approximately simultaneously with the detection of the over discharge, and the operation mode of the protection circuit 120 is transitioned to the standby mode. Upon the battery charger being connected in the standby mode, the operation mode of the protection circuit 120 is transitioned to the over discharge protection mode, and the secondary battery 200 is charged by the battery charger. Then, if the cell voltage greater than or equal to the over discharge recovery voltage Vrel2 is detected by the over discharge detection circuit 27, the logic circuit 44 outputs the control signal for turning on the transistor 12 from the discharge control terminal 94, and turns the transistor 50 from on to off. That is, the operation mode of the protection circuit 120 is transitioned to the normal operation mode.

Also, upon detecting the discharge overcurrent detection signal or short-circuiting detection signal, the logic circuit 44 may output the control signal at low level for turning on the transistor 12 from the discharge control terminal 94 while it turns off the transistor 50 and turns on the transistor 53. Upon the transistor 53 being turned on, the current detection terminal 95 is pulled down to the ground voltage of the ground terminal 92 through the resistor 52. However, since the load enough to cause the discharge overcurrent or the short-circuiting current is connected to the load connection terminals 5 and 6, the voltage P− is raised to a voltage at the load connection terminal 5.

When the discharge overcurrent or the short-circuiting current is canceled by disconnecting the load enough to cause the discharge overcurrent or the short-circuiting current from the load connection terminals 5 and 6, etc., the voltage P− falls to the ground voltage of the ground terminal 92 due to turning on of the transistor 53. Thus, the logic circuit 44 cancels performing the discharge overcurrent protection operation or the short-circuiting protection operation. That is, an automatic recovery from the discharge overcurrent protection operation or the short-circuiting protection operation can be achieved by disposing the transistor 53.

The overcharge detection voltage Vdet1 or the overcharge recovery voltage Vrel1 is an example of a threshold voltage used for determining whether the overcharge protection operation is required. The threshold voltage data for setting the overcharge detection voltage Vdet1 or the overcharge recovery voltage Vrel1 is an example of parameter data stored in the memory 60 in advance, and it is retrieved from the memory 60 to be provided to the overcharge protection circuit 22 by the retrieving/writing control circuit 80. Similarly, the threshold voltage data for setting the over discharge detection voltage Vdet2, the over discharge recovery voltage Vrel2, the discharge overcurrent detection voltage Vdet3, the charge overcurrent detection voltage Vdet4, the short-circuiting detection voltage Vshort, and the standby threshold voltage Vstb are provided.

Therefore, by changing the threshold voltage data for setting the overcharge detection voltage Vdet1 stored in the memory 60, the overcharge detection voltage Vdet1 can be changed into a protection voltage value corresponding to the changed threshold voltage data. For example, the overcharge detection circuit 22 or the retrieving/writing control circuit 80 includes a threshold voltage setting circuit for setting the overcharge detection voltage Vdet1 to be a value defined by the threshold voltage data of the overcharge detection voltage Vdet1 by changing at least one of the resistances of the resistor 23 and the resistor 24 and the reference voltage 26 based on the threshold voltage data of the overcharge detection voltage Vdet1 retrieved from the memory 60. Similarly, the overcharge recovery voltage Vrel1, the over discharge detection voltage Vdet2, the over discharge recovery voltage Vrel2, the discharge overcurrent detection voltage Vdet3, the charge overcurrent detection voltage Vdet4, the short-circuiting detection voltage Vshort, or the standby threshold voltage Vstb are set.

The overcharge detection delay time tVdet1 is generated by an oscillator 43 and a counter 42 based on the delay time data retrieved from the memory 60. The overcharge detection delay time tVdet1 is a time (period) from detection of the cell voltage greater than or equal to the overcharge detection voltage Vdet1 by the overcharge detection circuit 22 to start of the overcharge protection operation. The delay time data for setting the overcharge detection delay time tVdet1 is an example of the parameter data stored in the memory 60 and it is retrieved from the memory 60 to be provided to the logic circuit 44 or the counter 42 by the retrieving/writing control circuit 80. Similarly, the over discharge detection delay time tVdet2, the discharge overcurrent delay time voltage tVdet3, the charge overcurrent detection delay time tVdet4, and the short-circuiting detection delay time tshort are provided.

Additionally, the delay time data for setting the short-circuiting detection delay time tshort may be retrieved from the memory 60 to be provided to the delay circuit 41 by the retrieving/writing control circuit 80.

Therefore, by changing the delay time data for setting the overcharge detection delay time tVdet1 stored in the memory 60, the overcharge detection delay time tVdet1 can be changed into a value of the time corresponding to the changed delay time data. For example, the logic circuit 44 or the counter 42 includes a delay time setting circuit for setting the overcharge detection delay time tVdet1 to be a value defined by the delay time data of the overcharge detection delay time tVdet1 by changing the delay time generated by the counter 42 based on the delay data of the overcharge detection delay time tVdet1 retrieved from the memory 60. Similarly, the over discharge detection delay time tVdet2, the discharge overcurrent delay time voltage tVdet3, the charge overcurrent detection delay time tVdet4, and the short-circuiting detection delay time tshort are set.

For example, the counter 42 includes a circuit in which a plurality of flip-flops are connected in series, and the counter 42 can generate discrete delay times by selecting output points of the respective flip-flops based on the delay time data retrieved from the memory 60. The counter 42 operates in accordance with the clock signal from the oscillator 43.

Additionally, the delay circuit 41 may include a delay time setting circuit for setting the short-circuiting detection delay time tshort to be a value defined by the delay time data of the short-circuiting detection delay time tshort by changing a time constant of a primary delay circuit included in the delay circuit 41 based on the delay time data of the short-circuiting detection delay time tshort retrieved from the memory 60.

The protection operation circuit 98 may perform the protection operation of the secondary battery 200 based on option selection data retrieved from the memory 60. The option selection data which defines optional functions of the protection operation of the secondary battery 200 is an example of the parameter data written in the memory 60. The option selection data is retrieved from the memory 60 to be provided to the logic circuit 44 by the retrieving/writing control circuit 80.

Therefore, the logic circuit 44 can determine whether to select a certain optional function based on the option selection data retrieved from the memory 60. For example, the logic circuit 44 can determine whether to enable a charge permission/rejection selection circuit 45 based on the option selection data retrieved from the memory 60.

The charge permission/rejection selection circuit 45 is an example of an optional circuit for selecting permission/rejection of charge of the secondary battery 200 whose cell voltage is less than a certain value. The charge permission/rejection selection circuit 45 rejects the charge of the secondary battery 200 by turning off the transistor 11 while it permits the charge of the secondary battery 200 by turning on the transistor 11.

Additionally, the logic circuit 44 of the protection operation circuit 98 may determine whether to select an optional function other than the charge permission/rejection selection function of the charge permission/rejection selection circuit 45 based on the option selection data retrieved from the memory 60. For example, the logic circuit 44 may determine whether to enable a pulse charging adaptation function based on the option selection data retrieved from the memory 60.

Figure 12:
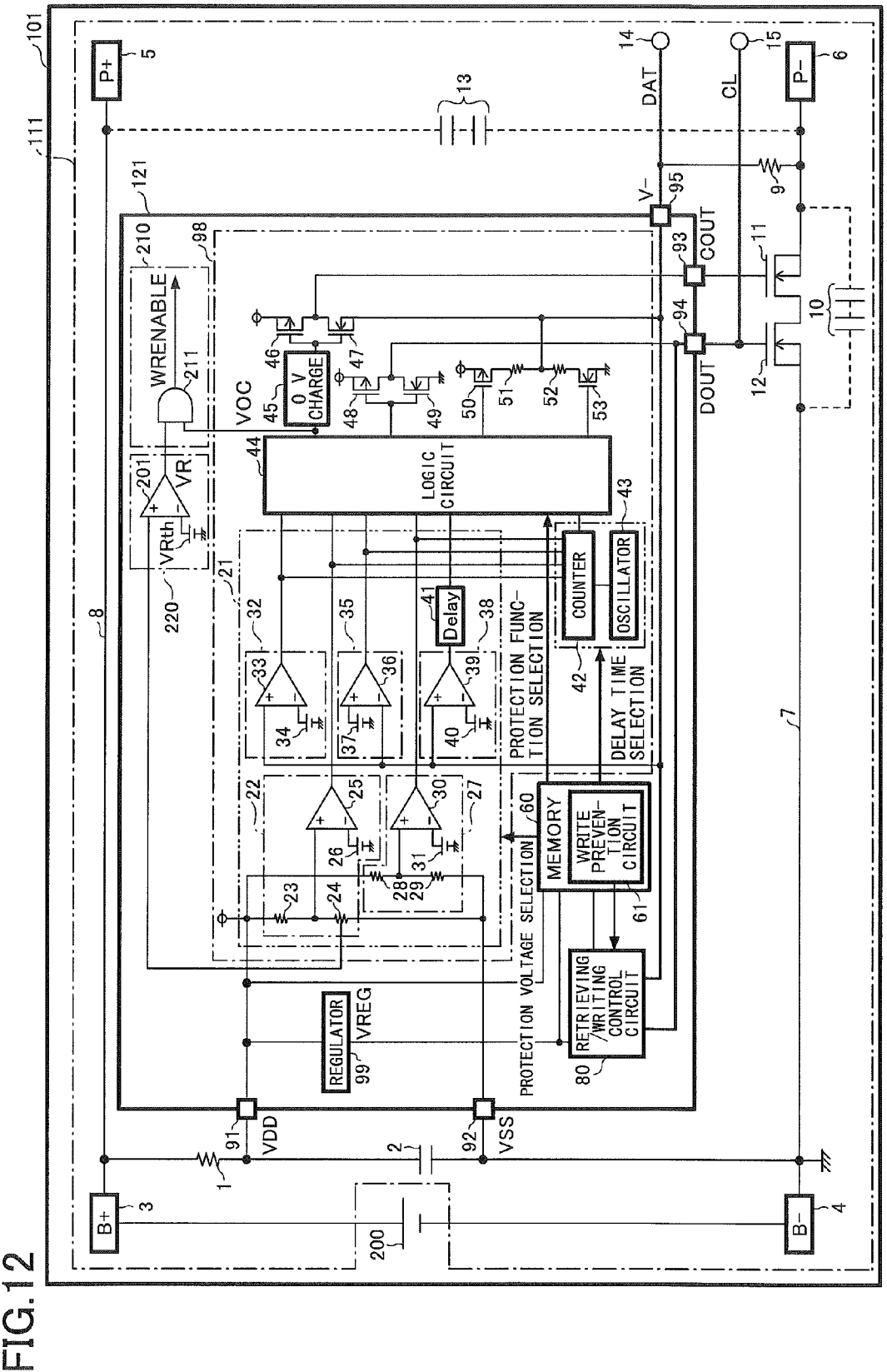
FIG. 12 is a diagram for illustrating another example configuration of a battery pack.

FIG. 12 is a diagram for illustrating an example configuration of a battery pack 101. The battery pack 101 includes a secondary battery 200 and a protection device 111 for protecting the secondary battery 200. The protection device 111 includes transistors 11 and 12 and a protection circuit 121. Descriptions on configurations shown in FIG. 11 and effects thereof which are similar to those shown in FIG. 12 are incorporated in the descriptions on configurations shown in FIG. 12 and effects thereof.

The writing terminal for writing the parameter data into the memory 60 may be also used as at least one of the terminal among a plurality of protection terminals including the charge control terminal 93, the discharge control terminal 94 and the current detection terminal 95. Area of the protection circuit can be reduced by using the writing terminal also as the protection terminal.

In the example shown in FIG. 12, the current detection terminal 95 receives not only a voltage according to current flowing in the secondary battery 200 but also the parameter data signal DAT, while the discharge control terminal 94 not only outputs the signal for preventing the discharge of the secondary battery 200 but also receives the clock signal CL.

The current detection terminal 95 includes a detection part for detecting the voltage input at the current detection terminal 95, and a part of the detection part can be also used as a detection part for detecting the parameter data signal DAT. Thus, the area of the protection circuit can be efficiently reduced. A circuit connected to a high voltage withstand terminal should be formed of high voltage withstand elements, therefore if a high voltage withstand terminal is used both for receiving and outputting discrete signals, the circuit scale may increase. However, the discharge control terminal 94 is a lower voltage withstand terminal in comparison to the charge control terminal 93. Therefore, the circuit scale can be reduced even when the terminal for outputting the signal for preventing the discharge is also used as the terminal for receiving the clock signal CL.

Additionally, the protection terminal also used as the terminal for writing the parameter data into the memory 60 may be used in a different manner. For example, the parameter data signal DAT may be input at the charge control terminal 93 while the clock signal CL may be input at the current detection terminal 95.

Herein above, although the secondary battery protection circuit, a secondary battery protection device, a battery pack and a data writing method have been described with respect to specific embodiments, the appended claims are not to be thus limited. It should be understood that the various changes, substitutions, and alterations could be made hereto without departing from the spirit and scope of the claims. Further, all or part of the components of the embodiments described above can be combined.

For example, the secondary battery protection circuit or the battery protection device may be used in a manner other than the battery pack. For example, the secondary battery protection circuit or the battery protection device may not be included in the battery pack but it may be attached to the product.

Also, the writing method for writing the parameter data into the memory is not limited to the aforementioned method using a double wire system, but it may be a method using another system (for example, single wire system or triple wire system). Therefore, number of the protection terminals being also used as the terminal for writing the parameter data is not limited to two, but it may be one or three.

What is claimed is:

1. A secondary battery protection circuit for protecting a secondary battery comprising:
 a power supply terminal;
 a protection operation circuit configured to monitor a state of the secondary battery through the power supply terminal to generate a signal for turning on/off conduction of a current path between the secondary battery and a load according to a protection state determined by the monitored state of the secondary battery;
 a nonvolatile memory in which data is written by a writing voltage being provided at the power supply terminal, an operation of the secondary battery protection circuit being controlled by the data;
 a voltage generation circuit configured to generate from an input voltage at the power supply terminal a provision voltage which is provided to a low withstand voltage circuit, wherein a withstanding voltage of the low withstand voltage circuit is less than a withstanding voltage of a high withstand voltage circuit to which the writing voltage is provided; and
 a control circuit configured to enable the nonvolatile memory to store the data therein in accordance with the protection state of the protection operation circuit upon an input voltage at the power supply terminal being greater than a determination threshold voltage for determining the writing voltage.

2. The secondary battery protection circuit as claimed in claim 1, wherein a threshold voltage for detecting overcharge of the secondary battery is set to be less than the writing voltage, and upon the protection state being an overcharge protection state, the protection operation circuit outputs a protection signal after a certain delay time passes from the detection of the overcharge of the secondary battery in response to detecting the overcharge of the secondary battery based on the threshold voltage, thereby turning off the conduction of the current path between the secondary battery and a load to protect the secondary battery from being overcharged.

3. The secondary battery protection circuit as claimed in claim 2, wherein the control circuit enables the nonvolatile memory to have the data written therein upon detecting that the input voltage is greater than a determination threshold voltage for determining the writing voltage and the protection operation circuit is in the overcharge protection state.

4. The secondary battery protection circuit as claimed in claim 1, wherein the secondary battery protection circuit operates so as to protect the secondary battery from being overcharged when the nonvolatile memory is enabled to have the data written therein.

5. The secondary battery protection circuit as claimed in claim 1, wherein the voltage generation circuit clamps the provision voltage at a voltage less than the writing voltage.

6. The secondary battery protection circuit as claimed in claim 5, wherein the voltage generation circuit includes a regulator including an output transistor for outputting the provision voltage.

7. The secondary battery protection circuit as claimed in claim 6, wherein the output transistor is a depletion type n-channel MOS transistor.

8. A secondary battery protection device comprising:
 the secondary battery protection circuit as claimed in claim 1;
 a charge path shutoff unit capable of shutting off a charge path of the secondary battery; and a discharge path shutoff unit capable of shutting off a discharge path of the secondary battery.

9. A battery pack comprising:
the secondary battery protection device as claimed in claim 8; and
the secondary battery.

10. A method of writing data into a nonvolatile memory included in a secondary battery protection circuit, the secondary battery protection circuit including
a secondary battery protection operation circuit configured to monitor a state of the secondary battery through a power supply terminal to generate a signal for turning on/off conduction of a current path between the secondary battery and a load according to a protection state determined by the monitored state of the secondary battery, wherein
the nonvolatile memory is capable of having data written therein by a writing voltage being provided at the power supply terminal, an operation of the secondary battery protection circuit being controlled by the data, the method comprising the step of
enabling the nonvolatile memory to store the data therein in accordance with the protection state of the protection operation circuit upon an input voltage at the power supply terminal being greater than a determination threshold voltage for determining the writing voltage.

* * * * *